(12) United States Patent
Murakami

(10) Patent No.: US 11,040,642 B2
(45) Date of Patent: Jun. 22, 2021

(54) VENTILATION SHEET AND SEAT AIR CONDITIONER

(71) Applicant: DENSO CORPORATION, Kariya (JP)

(72) Inventor: Hironobu Murakami, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/381,403

(22) Filed: Apr. 11, 2019

(65) Prior Publication Data

US 2019/0232835 A1    Aug. 1, 2019

Related U.S. Application Data

(63) Continuation of application No. PCT/JP2017/030419, filed on Aug. 24, 2017.

(30) Foreign Application Priority Data

Oct. 24, 2016  (JP) .............................. JP2016-207963

(51) Int. Cl.
  *B60N 2/56*    (2006.01)
  *B60N 2/58*    (2006.01)
  *B60H 1/00*    (2006.01)
  *A47C 7/74*    (2006.01)

(52) U.S. Cl.
  CPC .............. *B60N 2/5642* (2013.01); *A47C 7/74* (2013.01); *B60H 1/00285* (2013.01); *B60N 2/56* (2013.01); *B60N 2/565* (2013.01); *B60N 2/5628* (2013.01); *B60N 2/5657* (2013.01); *B60N 2/58* (2013.01); *B60N 2/5825* (2013.01)

(58) Field of Classification Search
  None
  See application file for complete search history.

(56) References Cited

U.S. PATENT DOCUMENTS

| | | | | |
|---|---|---|---|---|
| 3,030,145 | A | * | 4/1962 | Kottemann ............... B60N 2/60 297/180.11 |
| 4,867,508 | A | * | 9/1989 | Urai .................... B29D 99/0092 297/452.62 |
| 5,626,387 | A | * | 5/1997 | Yeh ......................... A47C 7/744 297/180.11 |
| 5,921,858 | A | * | 7/1999 | Kawai .................. B60N 2/6054 454/120 |

(Continued)

FOREIGN PATENT DOCUMENTS

| | | |
|---|---|---|
| JP | H07011962 U | 2/1995 |
| JP | 4999455 B2 | 8/2012 |

(Continued)

*Primary Examiner* — David E Allred
(74) *Attorney, Agent, or Firm* — Harness, Dickey & Pierce, P.L.C.

(57) ABSTRACT

A ventilation sheet is installed between a seat pad and a skin that form a seat of a vehicle. The ventilation sheet includes a ventilation sheet main body formed in a thin plate-shape including an air flow passage through which an air flow flows, a plurality of openings in communication with the air flow passage of the ventilation sheet main body, the plurality of openings formed to open at a surface of the ventilation sheet main body facing the skin, and a connection passage in communication with the air flow passage of the ventilation sheet main body and in communication with a pad hole provided in the seat pad.

10 Claims, 14 Drawing Sheets

(56) References Cited

U.S. PATENT DOCUMENTS

| | | | | |
|---|---|---|---|---|
| 6,109,688 A * | 8/2000 | Wurz | A47C 7/744 | 297/180.13 |
| 7,013,653 B2 * | 3/2006 | Kamiya | B60N 2/5635 | 62/244 |
| 7,877,827 B2 * | 2/2011 | Marquette | F24H 9/2071 | 5/423 |
| 7,931,330 B2 * | 4/2011 | Itou | B60N 2/5635 | 297/180.14 |
| 10,029,591 B1 * | 7/2018 | Paez | B60N 2/60 | |
| 10,632,877 B2 * | 4/2020 | Kondo | B60N 2/5657 | |
| 10,709,251 B1 * | 7/2020 | Rothman | A47C 7/18 | |
| 2002/0096915 A1 * | 7/2002 | Haupt | B60H 1/00285 | 297/180.13 |
| 2003/0186642 A1 * | 10/2003 | Aoki | B60N 2/5657 | 454/120 |
| 2006/0060344 A1 * | 3/2006 | Esaki | B60H 1/00285 | 165/287 |
| 2006/0208540 A1 * | 9/2006 | Lofy | B60N 2/565 | 297/180.14 |
| 2006/0290175 A1 * | 12/2006 | Hartwich | B60H 1/00285 | 297/180.1 |
| 2007/0188007 A1 * | 8/2007 | Lazanja | B60N 2/5621 | 297/452.42 |
| 2007/0277313 A1 * | 12/2007 | Terech | A47C 7/74 | 5/421 |
| 2009/0000031 A1 * | 1/2009 | Feher | A47C 7/748 | 5/423 |
| 2009/0033130 A1 * | 2/2009 | Marquette | B60N 2/5657 | 297/180.15 |
| 2010/0295339 A1 * | 11/2010 | Siu | A47C 7/744 | 297/180.14 |
| 2011/0109128 A1 * | 5/2011 | Axakov | A47C 21/044 | 297/180.1 |
| 2012/0080911 A1 * | 4/2012 | Brykalski | B60N 2/565 | 297/180.15 |
| 2012/0261974 A1 * | 10/2012 | Yoshizawa | B60N 2/5642 | 297/452.42 |
| 2013/0020852 A1 * | 1/2013 | Corcoran | B60N 2/5635 | 297/452.18 |
| 2015/0274049 A1 * | 10/2015 | Langensiepen | B60N 2/5642 | 297/180.12 |
| 2015/0329027 A1 * | 11/2015 | Axakov | B60N 2/565 | 297/180.13 |
| 2015/0336492 A1 * | 11/2015 | Hugues | B29C 44/0469 | 297/452.48 |
| 2016/0144754 A1 * | 5/2016 | Bauer | B60N 2/565 | 297/452.47 |
| 2016/0207431 A1 * | 7/2016 | Abe | B60N 2/5642 | |
| 2017/0196362 A1 * | 7/2017 | Miron | B60N 2/5657 | |
| 2017/0240078 A1 * | 8/2017 | Ishii | B60N 2/5678 | |
| 2017/0297464 A1 * | 10/2017 | White | B60N 2/70 | |
| 2018/0065524 A1 * | 3/2018 | Bauer | B60N 2/5635 | |
| 2018/0201089 A1 * | 7/2018 | Fujii | B60H 1/00521 | |
| 2019/0061464 A1 * | 2/2019 | Dry | B60H 1/00285 | |
| 2020/0031257 A1 * | 1/2020 | Okimura | B60N 2/5657 | |
| 2020/0207243 A1 * | 7/2020 | Rogers | B60N 2/5642 | |

FOREIGN PATENT DOCUMENTS

| | | |
|---|---|---|
| JP | 2016132448 A | 7/2016 |
| WO | WO-2005084493 A1 | 9/2005 |
| WO | WO-2018105264 A1 | 6/2018 |

* cited by examiner

US 11,040,642 B2

VENTILATION SHEET AND SEAT AIR CONDITIONER

CROSS REFERENCE TO RELATED APPLICATIONS

The present application is a continuation application of International Patent Application No. PCT/JP2017/030419 filed on Aug. 24, 2017, which designated the United States and claims the benefit of priority from Japanese Patent Application No. 2016-207963 filed on Oct. 24, 2016.

TECHNICAL FIELD

The present disclosure relates to a ventilation sheet and a seat air conditioner including the ventilation sheet.

BACKGROUND

Seat air conditioners for vehicle seats may include a seat pad formed with a plurality of ventilation holes, and air blown out through these ventilation holes passes through the seat skin into the passenger compartment.

SUMMARY

In one aspect of the present disclosure, a ventilation sheet is installed between a seat pad and a skin that form a seat of a vehicle. The ventilation sheet may include a ventilation sheet main body formed in a thin plate-shape including an air flow passage through which an air flow flows, a plurality of openings in communication with the air flow passage of the ventilation sheet main body, the plurality of openings formed to open at a surface of the ventilation sheet main body facing the skin, and a connection passage in communication with the air flow passage of the ventilation sheet main body and in communication with a pad hole provided in the seat pad.

DETAILED DESCRIPTION

Figure 1:
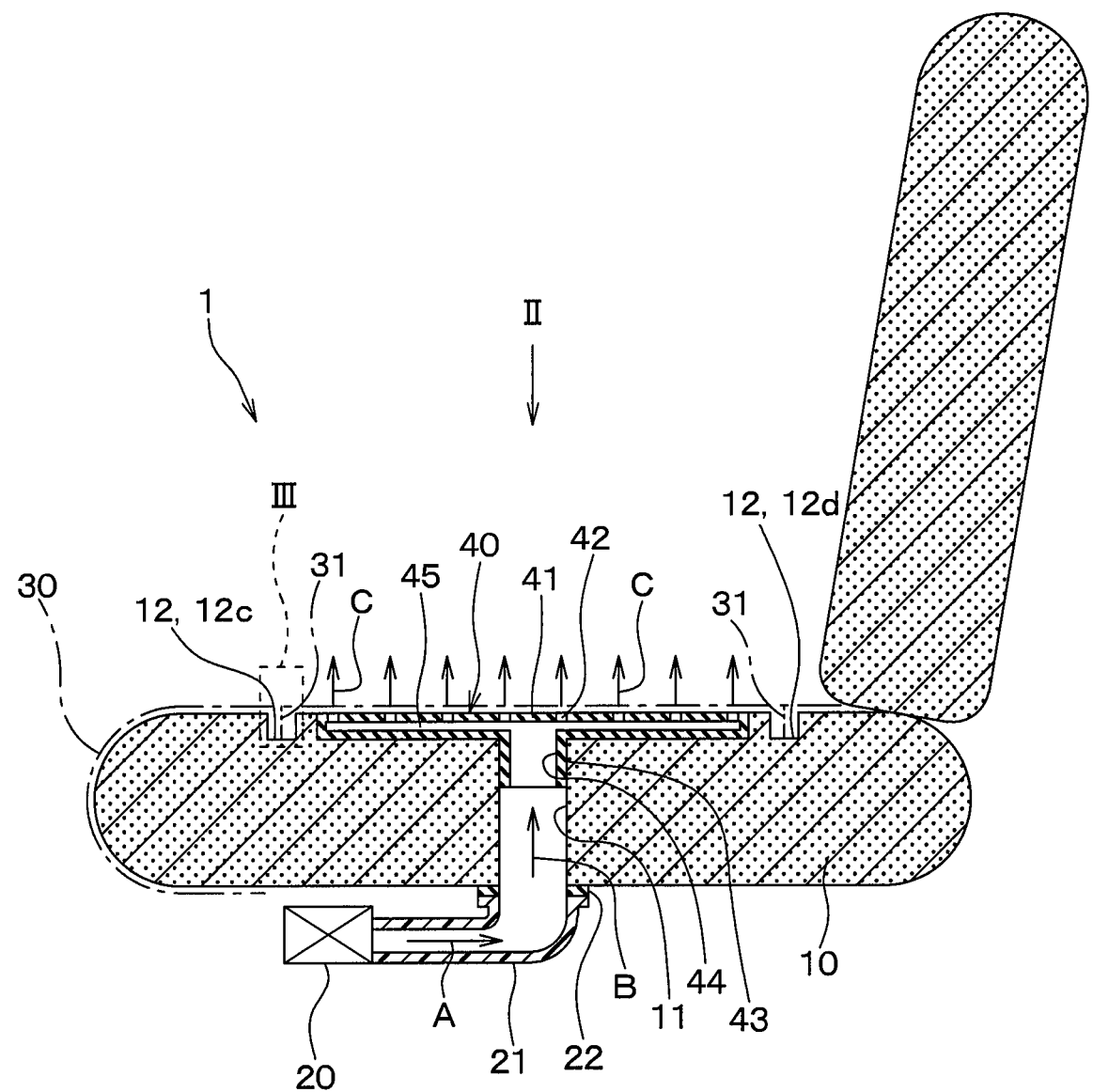
FIG. 1 is a diagram showing a cross-sectional configuration of a seat air conditioner according to a first embodiment.

Embodiments of the present disclosure will be described below with reference to the drawings. In the following embodiments, the same reference numerals are assigned to parts that are the same or equivalent to each other to describe the same.

First Embodiment

A first embodiment will be described with reference to the drawings. A seat air conditioner according to the present embodiment is installed in a vehicle interior of a vehicle, blows out an air into the vehicle interior from a seating surface, or suctions the air in the vehicle interior into the seating surface, thereby preventing steaming between the seat air conditioner and an occupant and improving the comfort of the occupant.

As shown in FIG. 1, the seat air conditioner 1 includes a seat pad 10, a blower 20, a skin 30, a ventilation sheet 40, and the like. In FIG. 1 and other figures, in order to clearly distinguish the skin 30 from other configurations, the skin 30 is indicated by a dot-and-dash line.

The seat pad 10 forms a seat on which an occupant sits. The seat pad 10 is made of urethane foam or the like and is provided on a frame member not shown. As a result, the seat pad 10 can elastically support a load caused when the occupant is seated. The seat pad 10 has a pad hole 11 through which an air flow generated by the blower 20 flows. The pad hole 11 penetrates through the seat pad 10 in a thickness direction.

The blower 20 is installed, for example, under a seat, and generates an air flow by rotating an impeller (not shown) by driving a motor (not shown). As the blower 20, for example, a centrifugal fan, an axial flow fan, a diagonal flow fan, or the like can be employed. A duct 21 is connected to the blower 20. A sealing member 22 is provided between the duct 21 and the seat pad 10. The sealing member 22 prevents the air flow from leaking from the connection point between the duct 21 and the seat pad 10. As indicated by an arrow A, the air flow generated by the driving of the blower 20 passes through the duct 21 and is supplied to the pad hole 11 of the seat pad 10. As a result, the air flow generated by the blower 20 flows through the pad hole 11 of the seat pad 10, as indicated by an arrow B.

Figure 2:
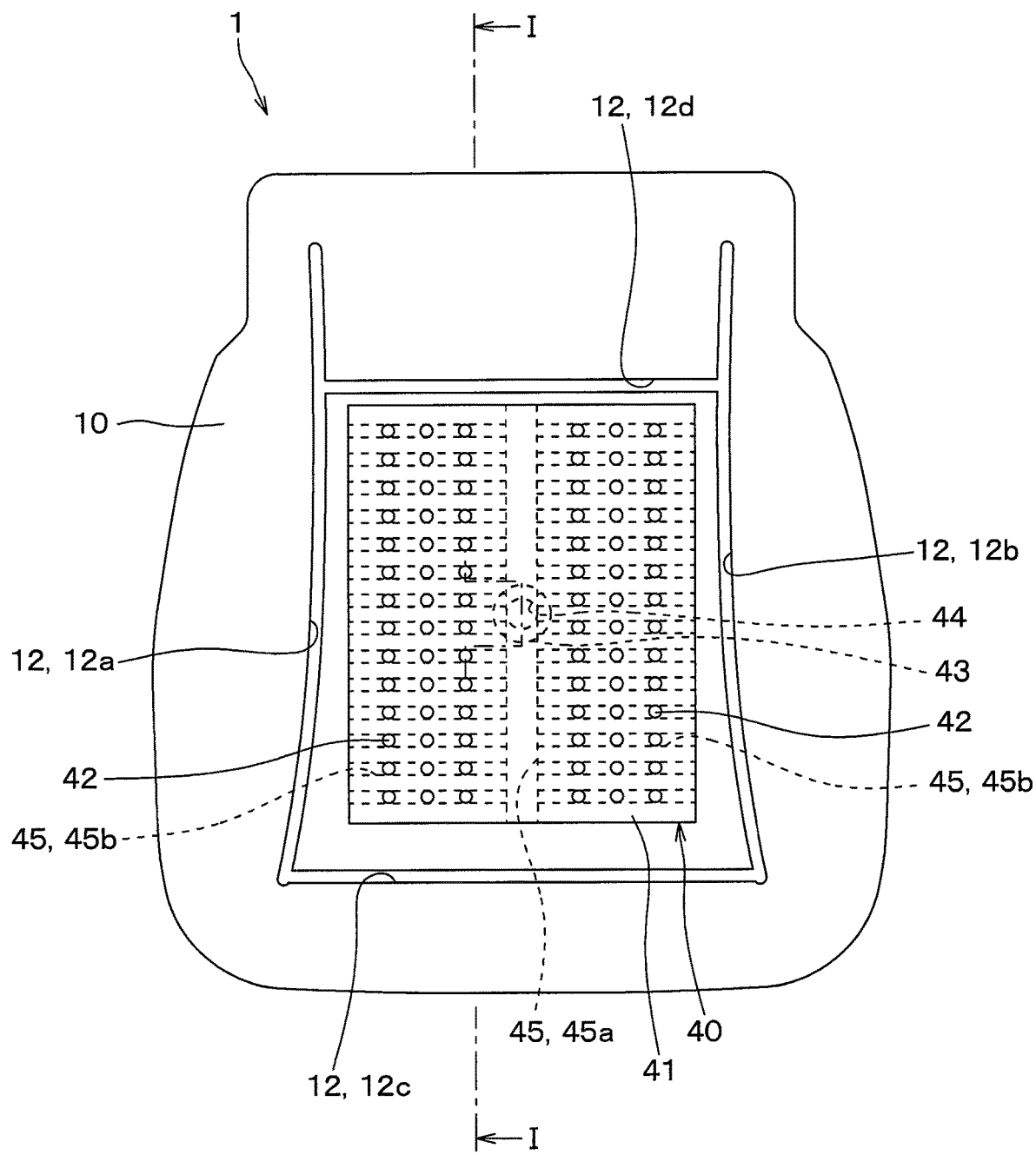
FIG. 2 is an arrow view in a direction II of FIG. 1.
Figure 3:
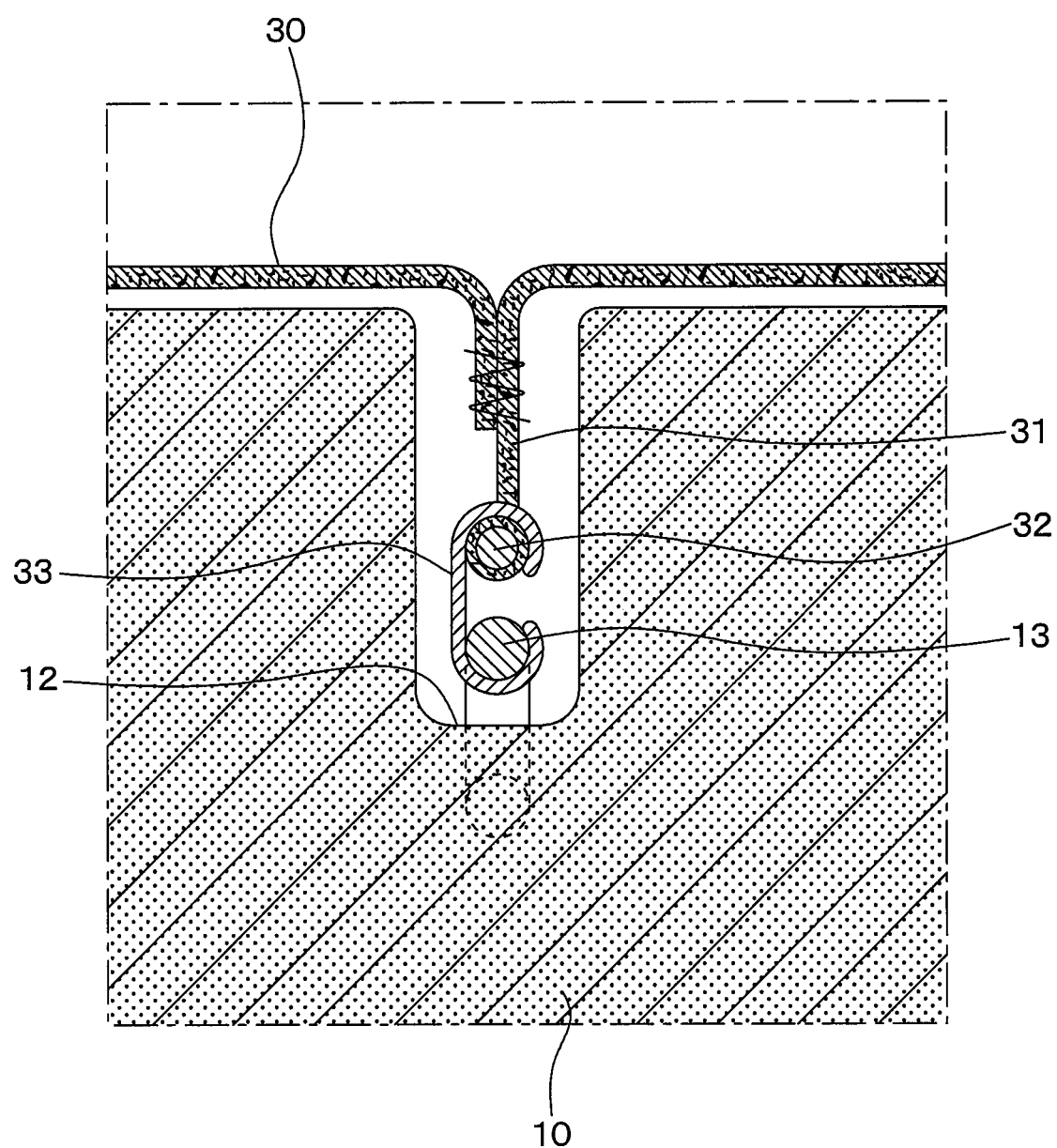
FIG. 3 is an enlarged view of a portion III of FIG. 1.

The seat pad 10 has the multiple hanging grooves 12 for fixing the skin 30. As shown in FIG. 2, the hanging grooves 12 are provided on the left, right, front, and rear of the surface of the seating surface side of the seat pad 10. More specifically, the hanging grooves 12 include two left and right hanging grooves 12a and 12b extending in the front-rear direction, and two front and rear hanging grooves 12c and 12d extending in the left and right direction so as to connect the left and right hanging grooves 12a and 12b. As shown in FIG. 3, a pad side wire 13 is provided in a deep portion of the hanging groove 12. The pad side wire 13 is buried in the seat pad 10 by insert molding, and part of the pad side wire 13 is exposed in the hanging groove 12.

As shown in FIG. 1, the skin 30 covers a surface of the seat pad 10. More specifically, the skin 30 covers the seating surface side surface and the front, rear, left, and right surfaces of the seat pad 10. The skin 30 is made of a material having air permeability. Examples of the material of the skin 30 include leather, woven fabric, nonwoven fabric, resin sheet, mesh sheet, and the like having a large number of pores. The skin 30 has a hanging portion 31 at a position corresponding to the hanging groove 12 provided in the seat pad 10. As shown in FIG. 3, the hanging portion 31 is a portion in which end portions of the multiple dividing members forming the skin 30 are sewn together extend to a deep side of the hanging groove 12. The hanging portion 31 is provided with a skin side wire 32. A portion where the pad side wire 13 described above is exposed to the hanging groove 12 and the skin side wire 32 are caulked and fixed to each other by a C-shaped fixing bracket 33. As a result, the hanging portion 31 provided on the skin 30 is fixed in the hanging groove 12 of the seat pad 10, and the skin 30 is attached in a state of being in close contact with the surface of the seat pad 10.

As shown in FIG. 1, the ventilation sheet 40 is disposed between the seat pad 10 and the skin 30. The ventilation sheet 40 is provided in a recess provided on the surface of the seat pad 10. As a result, the ventilation sheet 40 does not protrude and the seating comfort is improved as compared with the case where the recess is not provided on the surface of the seat pad 10. As shown in FIG. 2, the ventilation sheet 40 is disposed between the multiple hanging grooves 12. For that reason, since the hanging grooves 12 are not covered by the ventilation sheet 40, the seat pad 10 and the skin 30 can be easily fixed to each other.

As shown in FIGS. 4 to 7, the ventilation sheet 40 includes a ventilation sheet main body 41, multiple openings 42, a cylindrical portion 43, a connection passage 44, and the like, and those configurations are integrally formed. As the material for forming the ventilation sheet 40, a rubber or an elastomer is preferred. This makes it possible to improve the seating comfort of the occupant.

Figure 16:
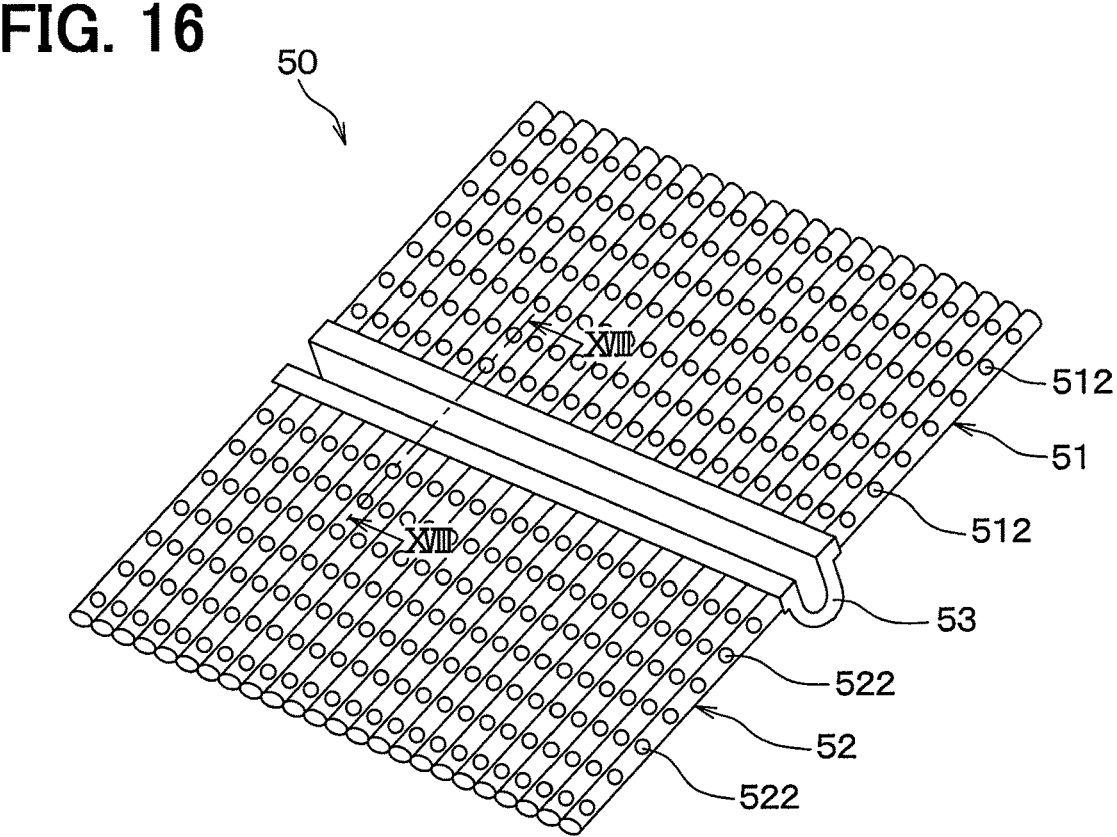
FIG. 16 is a perspective view of a ventilation sheet according to the seventh embodiment.
Figure 17:
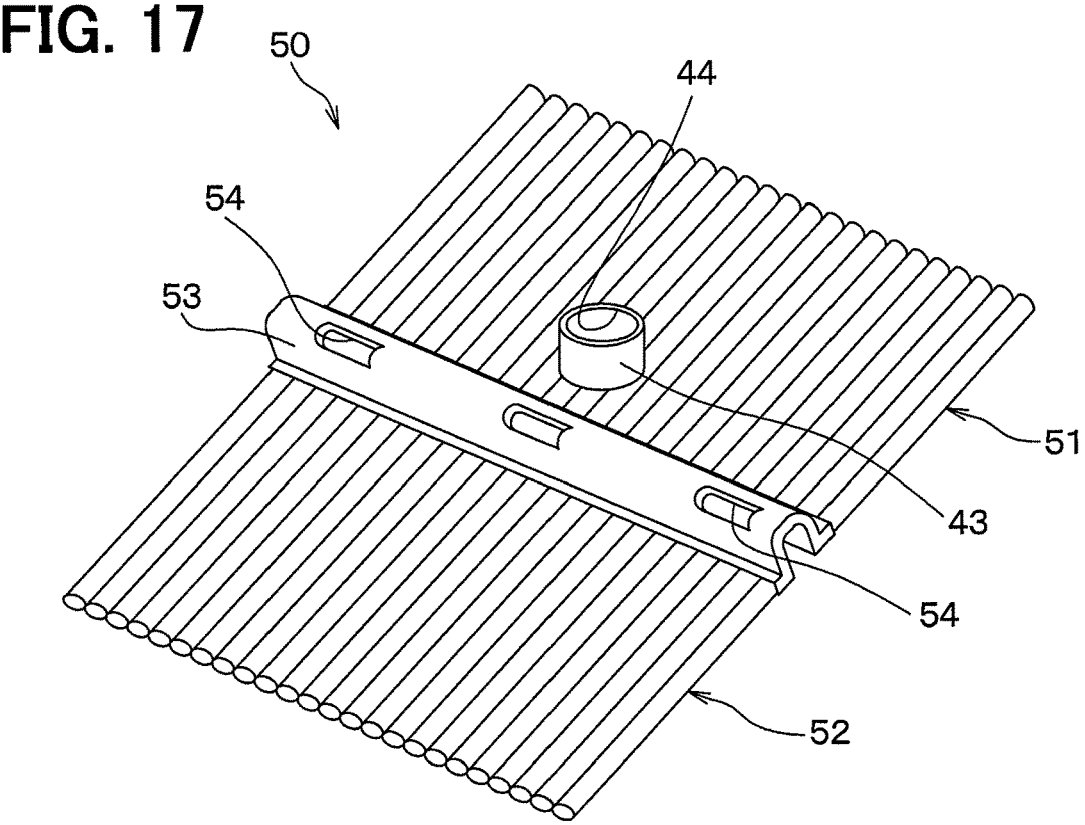
FIG. 17 is a perspective view of a ventilation sheet according to the seventh embodiment.

The ventilation sheet main body 41 is formed in a thin plate-shape and has multiple air flow passages 45 through which the air flow flows. In the first embodiment, the surface of the ventilation sheet 40 is planar. As will be described in a seventh embodiment to be described later, the surface of the ventilation sheet 40 may have an uneven shape. In that case, for example, as shown in FIGS. 16 and 17, the ventilation sheet 40 may have a shape in which multiple tubes having the air flow passages 45 are integrally formed.

Figure 4:
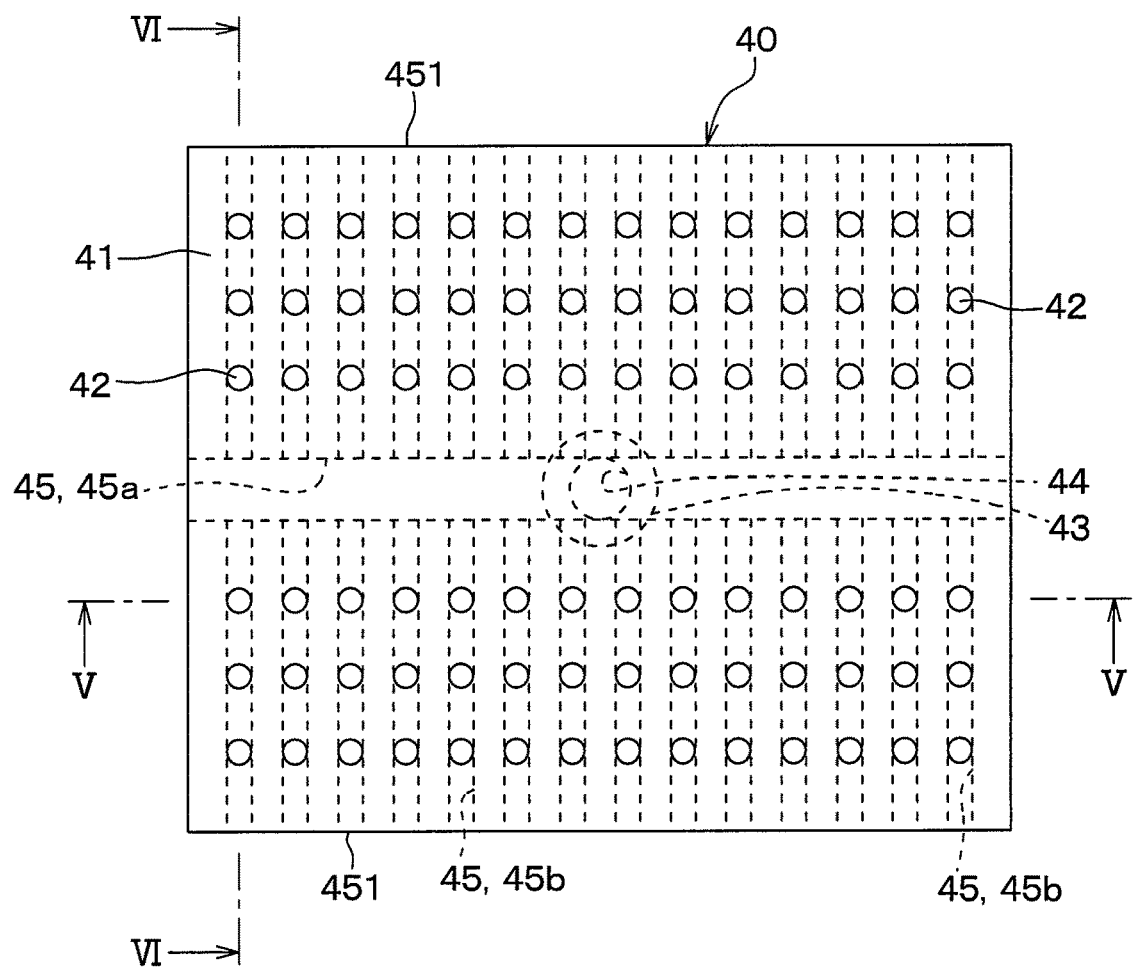
FIG. 4 is a plan view of a ventilation sheet according to the first embodiment.
Figure 5:
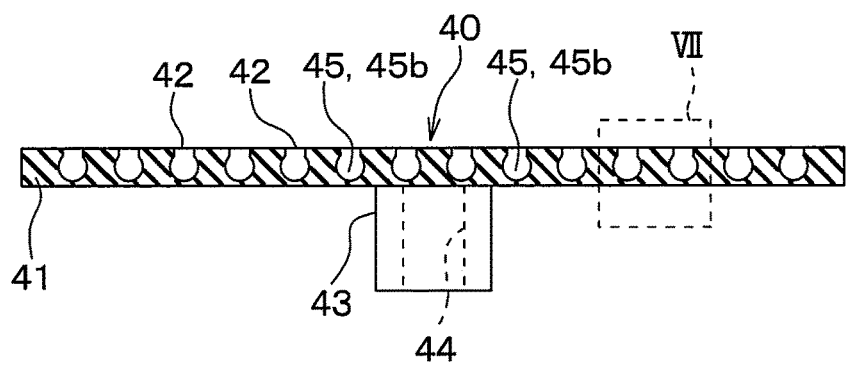
FIG. 5 is a cross-sectional view taken along a line V-V of FIG. 4.
Figure 6:
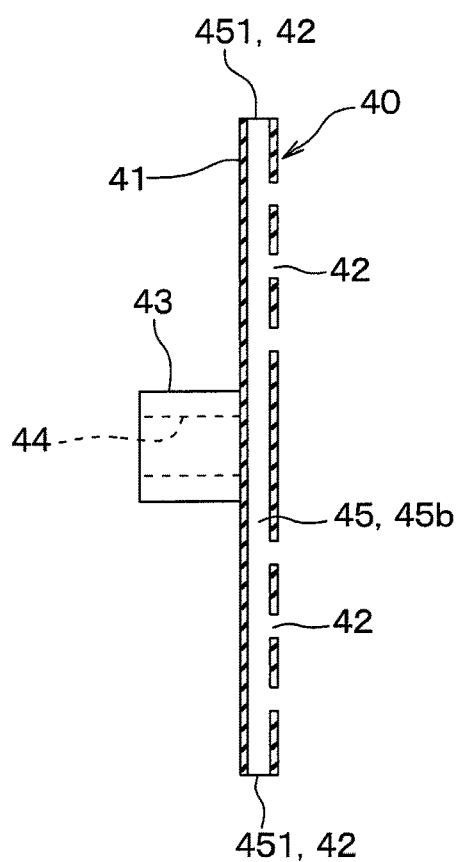
FIG. 6 is a cross-sectional view taken along a line VI-VI of FIG. 4.

As shown in FIGS. 4 to 6, in the first embodiment, the multiple ventilating passages 45 included in the ventilation sheet main body 41 include a trunk air flow passage 45a extending to the center portion and branch air flow passages 45b communicating with the trunk air flow passage 45a and extending in parallel with each other. The placement and shape of the trunk air flow passage 45a and the branch air flow passages 45b included in the multiple air flow passages 45 can be arbitrarily set.

Figure 7:
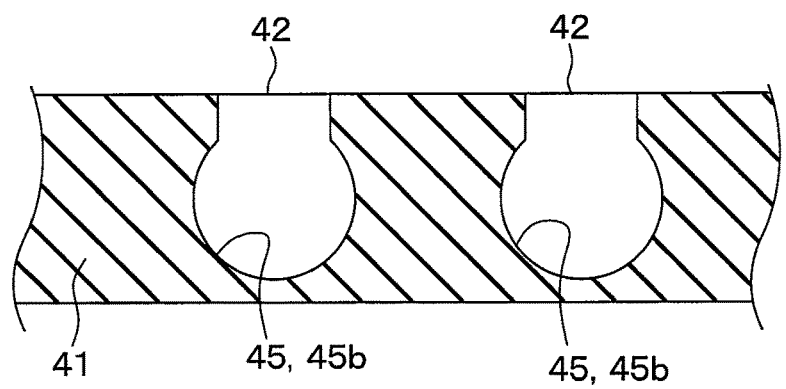
FIG. 7 is an enlarged view of a portion VII of FIG. 5.

As shown in FIG. 7, the cross-sectional shape of the inner wall of the branch air flow passage 45b is a round shape. As a result, the rigidity of the ventilation sheet main body 41 is increased, and when the occupant is seated in the seat, the ventilation sheet main body 41 is prevented from collapsing to reduce a cross-sectional area of the air flow passage 45. A cross-sectional shape of the branch air flow passage 45b can be arbitrarily set.

The multiple openings 42 communicate with the air flow passage 45 and open to a surface of the ventilation sheet main body 41 on the skin 30 side. The positions and the number of the multiple openings 42 can be arbitrarily set. As shown in FIG. 6, the opening 42 is also provided in a tip portion 451 of the branch air flow passage 45b located on an outer periphery of the ventilation sheet main body 41. The opening 42 may be provided not only on the branch air flow passage 45b but also on a surface of the trunk air flow passage 45a on the skin 30 side.

The cylindrical portion 43 is provided in a central region of the ventilation sheet main body 41, and extends from the ventilation sheet main body 41 to the seat pad 10 side in a cylindrical shape. The central region of the ventilation sheet main body 41 refers to a region inside an outer edge of the ventilation sheet main body 41. The connection passage 44 is provided inside the cylindrical portion 43. Therefore, the connection passage 44 is provided in the central region of the ventilation sheet main body 41. The connection passage 44 inside the cylindrical portion 43 opens to the air flow passage 45 of the ventilation sheet main body 41 at a position corresponding to a position between two thighs of the seated occupant. Since the cylindrical portion 43 opens at that position, the cylindrical portion 43 is unlikely to receive a seating pressure as compared with a case in which the cylindrical portion 43 opens just below hips and thighs of the occupant. As a result, a ventilation resistance is reduced, and an air is easily ventilated. The connection passage 44 opens to the air flow passage 45 of the ventilation sheet main body 41, and opens to an end portion of the cylindrical portion 43 opposite to the ventilation sheet main body 41.

As shown in FIG. 1, the cylindrical portion 43 is press-fitted and fixed to the pad hole 11 provided in the seat pad 10. The connection passage 44 communicates with the pad hole 11 in a state in which the cylindrical portion 43 is press-fitted into the pad hole 11.

As indicated by arrows A and B in FIG. 1, when the blower 20 is driven, the air flow generated in the blower 20 flows into the connection passage 44 of the ventilation sheet 40 through the duct 21 and the pad hole 11. After flowing through the trunk air flow passage 45a and the branch air flow passage 45b of the ventilation sheet main body 41, the air flow is blown out into the vehicle interior from the multiple openings 42 through the skin 30 as indicated by an arrow C. As a result, a hot air between the occupant seated in the seat air conditioner 1 and the skin 30 is discharged, and the comfort of the occupant is improved.

Now, in order to be compared with the seat air conditioner 1 according to the first embodiment described above, a seat air conditioner 100 according to a first comparative example will be described.

Figure 19:
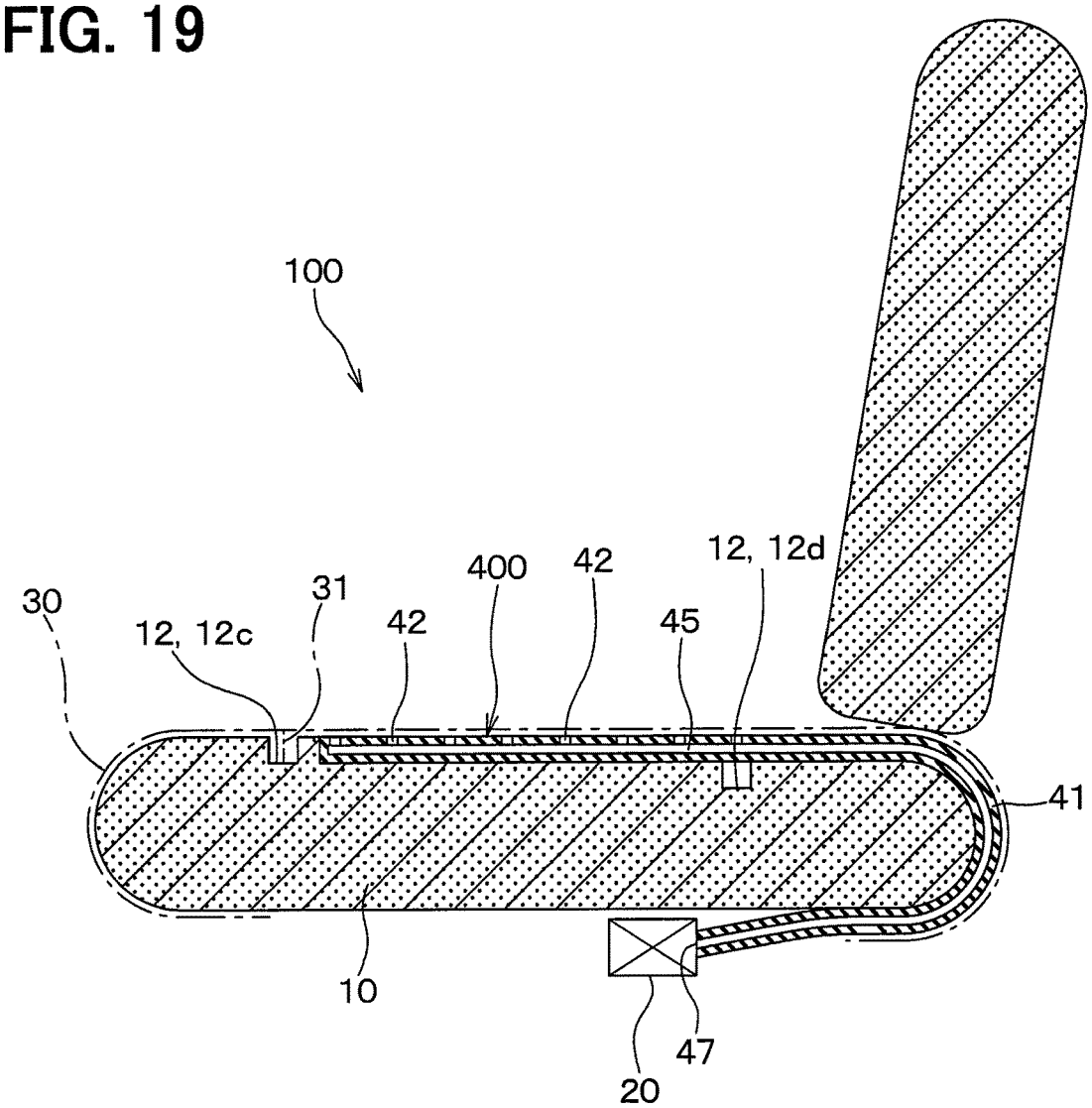
FIG. 19 is a diagram showing a cross-sectional configuration of a seat air conditioner according to a first comparative example.

As shown in FIG. 19, the seat pad 10 included in the seat air conditioner 100 of the first comparative example does not have a pad hole through which the air flow flows. A ventilation sheet 400 does not have a connection passage in a central region of the ventilation sheet 400, and an air is introduced into the air flow passage 45 from one end portion 47 of the ventilation sheet 400. For that reason, the ventilation sheet 400 curves from the seating surface side of the seat pad 10 along a shape of an end face of the seat pad 10 on the rear side in a vehicle traveling direction, and is connected to the blower 20 provided below the seat pad 10.

As in the first comparative example, when the ventilation sheet 400 is curved, the air flow passage 45 provided inside the ventilation sheet 400 is also curved, so that a ventilation resistance of the air flow passage 45 is increased. Therefore, in the first comparative example, there is a problem that the volume of air blown out from the multiple openings 42 into the vehicle interior or the amount of air suctioned into the multiple openings 42 in the vehicle interior is reduced.

The ventilation sheet 400 of the first comparative example covers a part of the hanging groove 12d provided on the rear side of the seating surface of the seat pad 10. For that reason, in the first comparative example, it is difficult to fix the seat pad 10 and the skin 30.

Next, a seat air conditioner 101 according to a second comparative example will be described.

Figure 20:
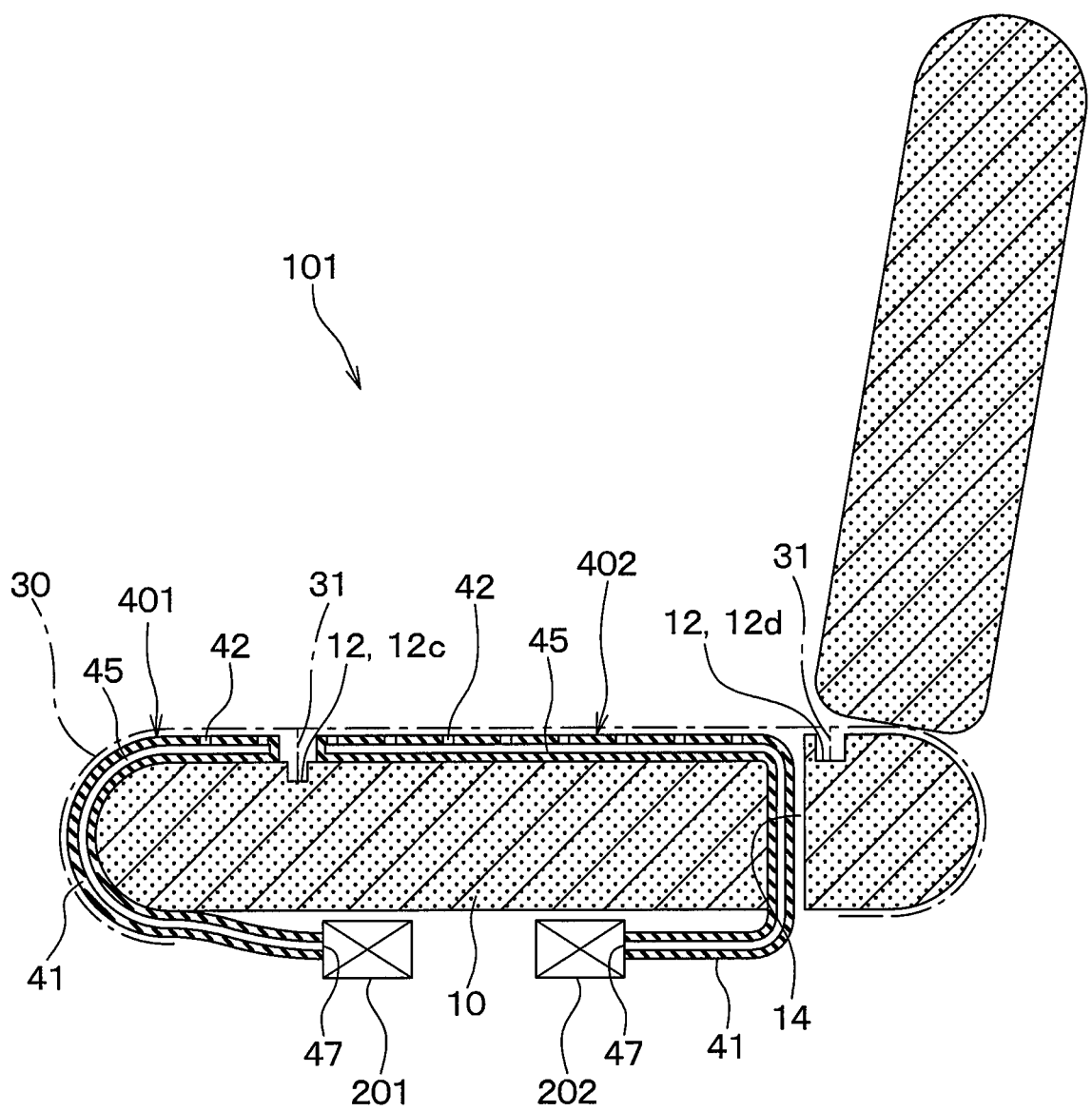
FIG. 20 is a diagram showing a cross-sectional configuration of a seat air conditioner according to a second comparative example.

As shown in FIG. 20, the seat air conditioner 101 according to the second comparative example includes two ventilation sheets 401 and 402, and two blowers 201 and 202 provided corresponding to the two ventilation sheets 401 and 402. One ventilation sheet 401 of the two ventilation sheets 401 and 402 is provided on a front side of the hanging groove 12c provided on the front side of the seating surface of the seat pad 10. The ventilation sheet 401 is curved along the shape of the end face of the seat pad 10 on the front side in the vehicle traveling direction, and is connected to the blower 201 provided below the seat pad 10.

The other ventilation sheet 402 of the two ventilation sheets 401 and 402 is provided between the hanging groove 12c provided on the front side of the seating surface of the seat pad 10 and the hanging groove 12d provided on the rear side of the seating surface. The ventilation sheet 402 passes through the through hole 14 provided in the seat pad 10 and is connected to the blower 202 provided below the seat pad 10.

As in the second comparative example, when the two ventilation sheets 401 and 402 and the two blowers 201 and 202 are provided for one seat pad 10, there is a concern that the number of parts increases, the configuration becomes complicated, and the manufacturing cost increases.

In contrast to the first and second comparative examples, the ventilation sheet 40 and the seat air conditioner 1 of the first embodiment described above exhibit the following effects.

(1) In the ventilation sheet 40 of the first embodiment, the connection passage 44 communicates with the air flow passage 45 of the ventilation sheet main body 41, and communicates with the pad hole 11 provided in the seat pad 10.

As a result, the ventilation sheet 40 is provided in a substantially flat state on the seating surface side of the seat pad 10 without being curved along the front end face or the rear end face of the seat pad 10 in the vehicle traveling direction as in the first and second comparative examples. For that reason, the ventilation resistance of the air flow passage 45 included in the ventilation sheet 40 is low. Therefore, this ventilation sheet 40 can increase the volume of air blown out into the vehicle interior from the multiple openings 42, thereby improving the comfort of the occupant.

The ventilation sheet 40 can be provided between the seat pad 10 and the skin 30 without covering the hanging grooves 12 provided in the seat pad 10. For that reason, with the use of the ventilation sheet 40, the seat pad 10 and the skin 30 can be easily fixed to each other by the hanging grooves 12.

Further, the ventilation sheet 40 can be provided between the hanging grooves 12 without increasing the number of the ventilation sheets 40 in order to avoid the position of the hanging groove 12 provided in the seat pad 10 as in the second comparative example. Therefore, with the use of the ventilation sheet 40, the number of parts can be reduced, the configuration can be simplified, and the manufacturing cost can be reduced.

(2) In the ventilation sheet 40 of the first embodiment, the ventilation sheet main body 41 has multiple branch air flow passages 45b disposed in parallel.

As a result, the rigidity of the ventilation sheet main body 41 is increased by the multiple branch air flow passages 45b and walls separating the branch air flow passages 45b from each other. For that reason, when the occupant is seated in the seat, the ventilation sheet main body 41 is prevented from collapsing to reduce the cross-sectional area of the branch air flow passage 45b. Therefore, the ventilation sheet 40 can increase the volume of air blown out into the vehicle interior from the multiple openings 42 or the amount of air in the vehicle interior, which is suctioned into the multiple openings 42.

(3) The ventilation sheet 40 according to the first embodiment is disposed between the multiple hanging grooves 12.

As a result, the seat pad 10 and the skin 30 can be easily fixed to each other by the hanging grooves 12.

(4) In the ventilation sheet 40 according to the first embodiment, the connection passage 44 is provided in a central region of the ventilation sheet main body 41.

As a result, a distance between an outer periphery of the ventilation sheet main body 41 and the connection passage 44 can be substantially uniformly brought closer to each other as compared with a configuration in which the air is introduced into the air flow passage 45 from one end portion 47 of the ventilation sheets 400, 401, and 402 as in the first and second comparative examples. For that reason, when the air is supplied from the pad hole 11 to the connection passage 44, the air can be blown out substantially uniformly from the multiple openings 42.

(5) The ventilation sheet 40 according to the first embodiment has the cylindrical portion 43 which extends from the ventilation sheet main body 41 in a cylindrical shape and provides the connection passage 44.

As a result, the cylindrical portion 43 is press-fitted into the pad hole 11 of the seat pad 10 with the result that the ventilation sheet 40 can be easily assembled to the seat pad 10.

(6) The ventilation sheet main body 41 and the cylindrical portion 43 forming the ventilation sheet 40 according to the first embodiment are formed to include a rubber or an elastomer.

As a result, the ventilation sheet 40 can improve the seating comfort of the occupant.

(7) In the ventilation sheet 40 according to the first embodiment, the cross section of the inner wall of the air flow passage 45 is round.

As a result, the rigidity of the ventilation sheet main body 41 is increased. For that reason, when the occupant is seated in the seat, the ventilation sheet main body 41 can be prevented from collapsing to reduce the cross-sectional area of the air flow passage 45.

(8) The seat air conditioner 1 according to the first embodiment includes the blower 20, the seat pad 10, the skin 30, and the ventilation sheet 40. The connection passage 44 included in the ventilation sheet 40 communicates with the air flow passage 45 and communicates with the pad hole 11 provided in the seat pad 10.

As a result, in the seat air conditioner 1, since the ventilation sheet 40 is installed in a substantially flat state on the seating surface side of the seat pad 10, compared with the first and second comparative examples, the volume of air blown out from the multiple openings 42 of the ventilation sheet 40 into the vehicle interior can be increased, and the comfort of the occupant can be enhanced.

Further, in the seat air conditioner 1, since the ventilation sheet 40 can be installed without covering the hanging grooves 12 provided in the seat pad 10, the seat pad 10 and the skin 30 can be easily fixed to each other by the hanging grooves 12.

Further, the seat air conditioner 1 can reduce the number of components of the ventilation sheet 40 and the blower 20, simplify the configuration, and reduce the manufacturing cost as compared with the second comparative example.

Second Embodiment

A second embodiment will be described. In the second embodiment, a cross-sectional shape of an air flow passage 45 is changed with respect to the first embodiment, and the other configuration is the same as in the first embodiment, and therefore, only portions different from the first embodiment will be described.

Figure 8:
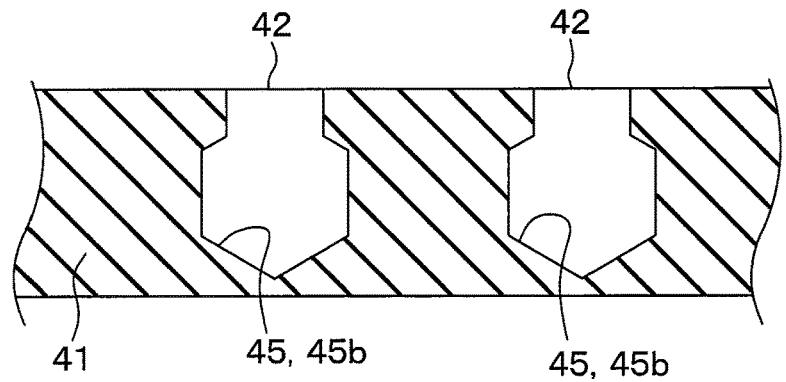
FIG. 8 is a partial enlarged view of a ventilation sheet according to a second embodiment.

FIG. 8 shows a cross-sectional shape of a branch air flow passage 45b among the trunk air flow passage 45a and the branch air flow passage 45b forming multiple air flow passages 45 included in a ventilation sheet main body 41. In the second embodiment, a cross section of an inner wall of the branch air flow passage 45b is polygonal. As a result, also in the second embodiment, similarly to the first embodiment, the rigidity of the ventilation sheet main body 41 is increased, and when the occupant is seated in the seat, the ventilation sheet main body 41 is prevented from collapsing to reduce the cross-sectional area of the air flow passage 45. For that reason, also in the second embodiment, in the ventilation sheet 40, a decrease in the ventilation resistance of the air flow passage 45 when the occupant is seated in the seat is inhibited. Therefore, the volume of air blown out from the multiple openings 42 into the vehicle interior is maintained, thereby being capable of improving the comfort of an occupant. The second embodiment can also exhibit the same operation and effects as those of the first embodiment.

Third Embodiment

A third embodiment will be described. In the third embodiment, a flow direction of an air flow formed by a blower 20 is changed as compared with the first embodiment, and the other configuration is the same as in the first embodiment, and therefore, only portions different from the first embodiment will be described.

Figure 9:
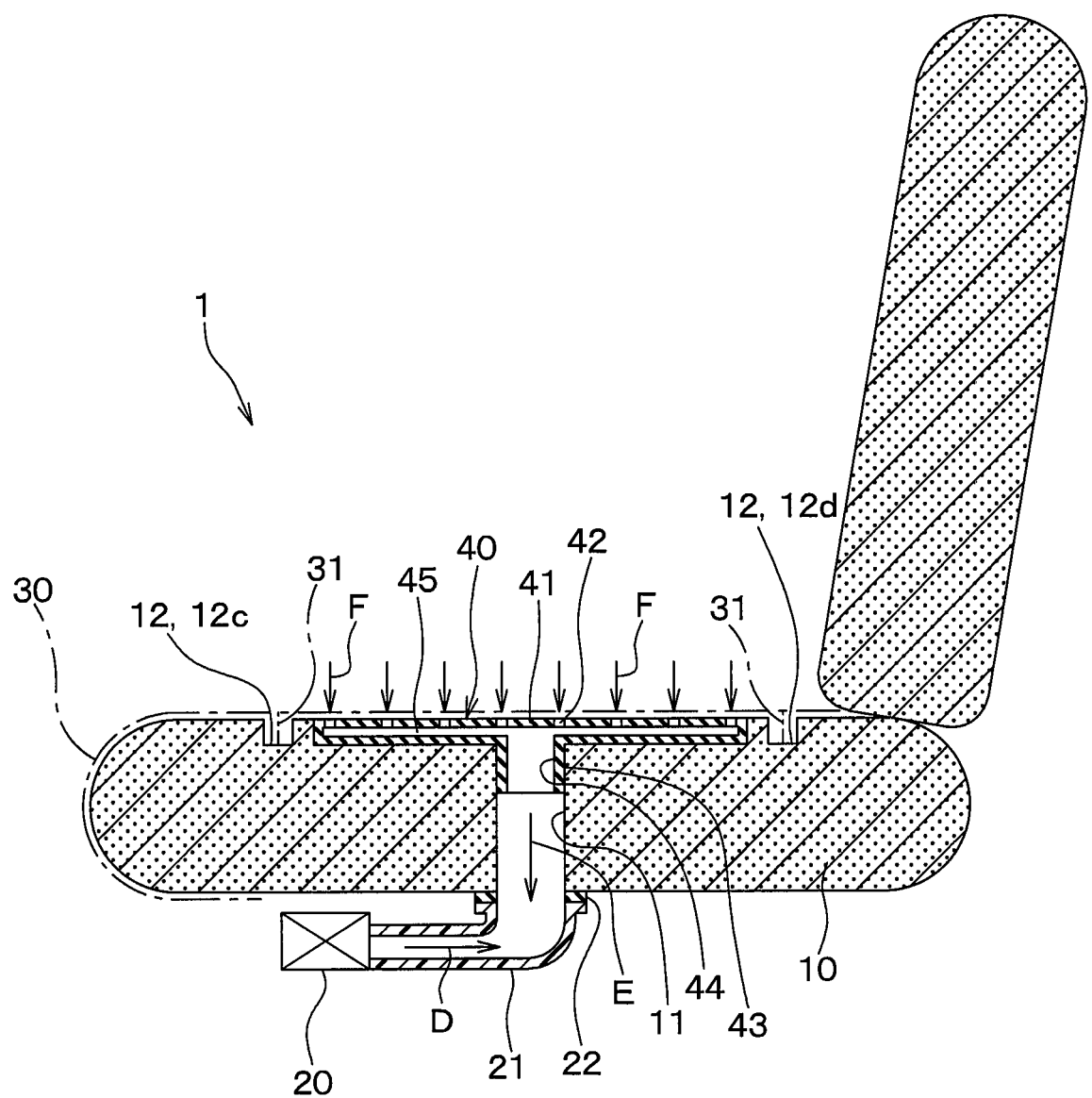
FIG. 9 is a diagram showing a cross-sectional configuration of a seat air conditioner according to a third embodiment.

As shown by arrows D and E in FIG. 9, in the third embodiment, when the blower 20 is driven, an air in a duct 21 and a pad hole 11 is suctioned by a blower 20, and an air pressure in a connection passage 44 and an air flow passage 45 of a ventilation sheet 40 is lowered. For that reason, as indicated by an arrow F, an air in a vehicle interior passes through a skin 30 and is suctioned into an air flow passage 45 of the ventilation sheet 40 from the multiple openings 42. As a result, the seat air conditioner 1 suctions a hot air between an occupant seated in the seat air conditioner 1 and the skin 30, thereby being capable of preventing steaming between the seat air conditioner 1 and the occupant and improving the comfort of the occupant. Therefore, the third embodiment can also exhibit the same operation and effects as those of the first and second embodiments.

Fourth Embodiment

A fourth embodiment will be described. In the fourth embodiment, a position of hanging grooves 12 provided in a seat pad 10 is changed from that in the first embodiment, and the other configuration is the same as that in the first embodiment, and therefore, only portions different from those in the first embodiment will be described.

Figure 10:
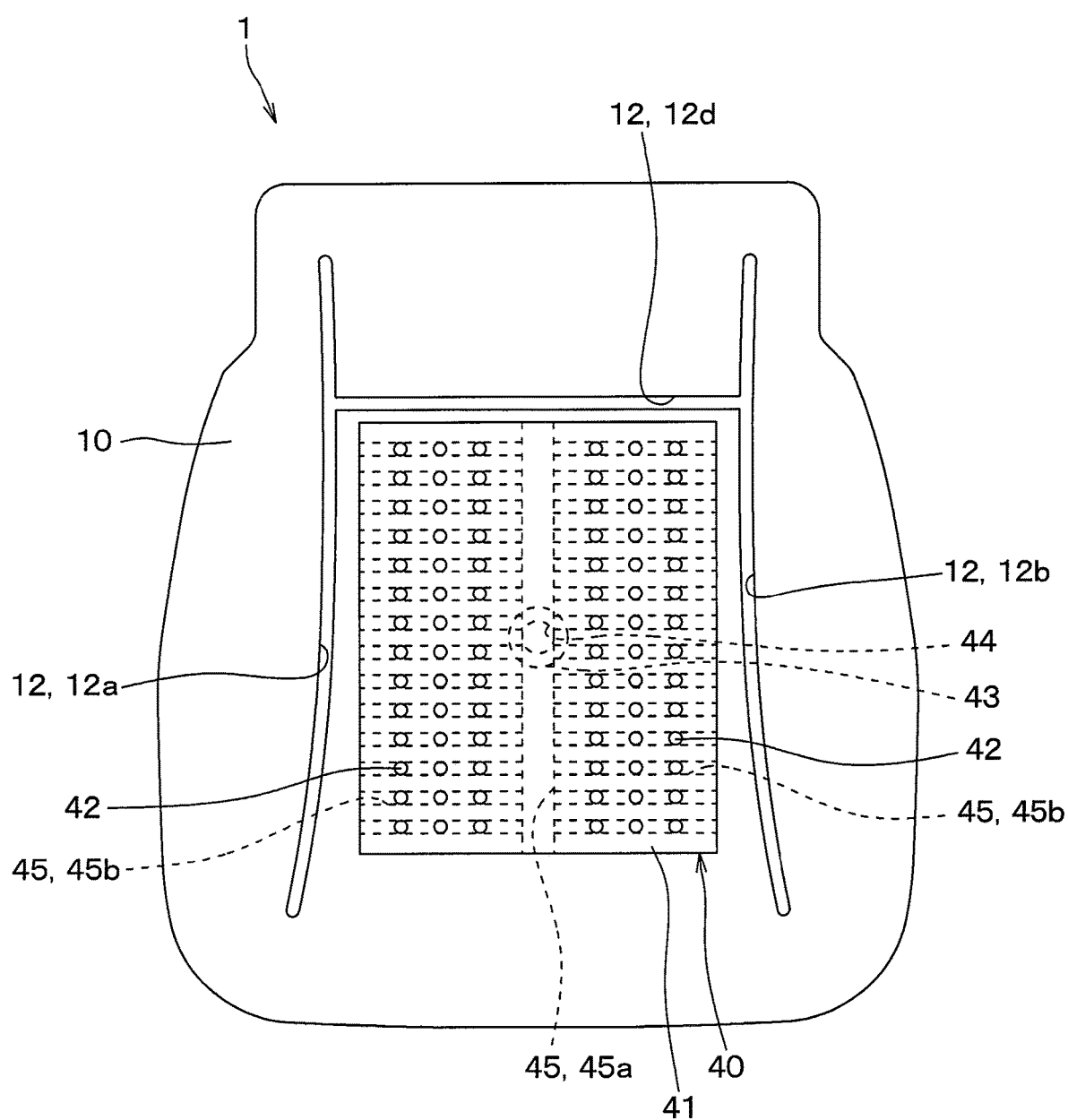
FIG. 10 is a plan view of a seat air conditioner according to a fourth embodiment.

As shown in FIG. 10, in the fourth embodiment, the hanging grooves 12 provided in the seat pad 10 are provided on the left, right, and rear of the seating surface side surface of the seat pad 10. More specifically, the hanging groove 12 includes two left and right hanging grooves 12a and 12b extending in a front-rear direction, and one rear hanging groove 12d extending in the left and right direction so as to connect the left and right hanging grooves 12a and 12b. In the fourth embodiment, no hanging groove is provided on a front side of a surface of a seating surface side of the seat pad 10. Also in the above configuration, the ventilation sheet 40 is disposed between the multiple hanging grooves 12a, 12b, and 12d. As a result, since the hanging grooves 12 are not covered by the ventilation sheet 40, the seat pad 10 and the skin 30 can be easily fixed to each other. Therefore, the fourth embodiment can also exhibit the same operation and effects as those of the first to third embodiments.

Fifth Embodiment

A fifth embodiment will be described. In the fifth embodiment, a duct 21 connecting a blower 20 and a pad hole 11 is eliminated from the first embodiment, and the other configuration is the same as in the first embodiment, and therefore, only the portions different from the first embodiment will be described.

Figure 11:
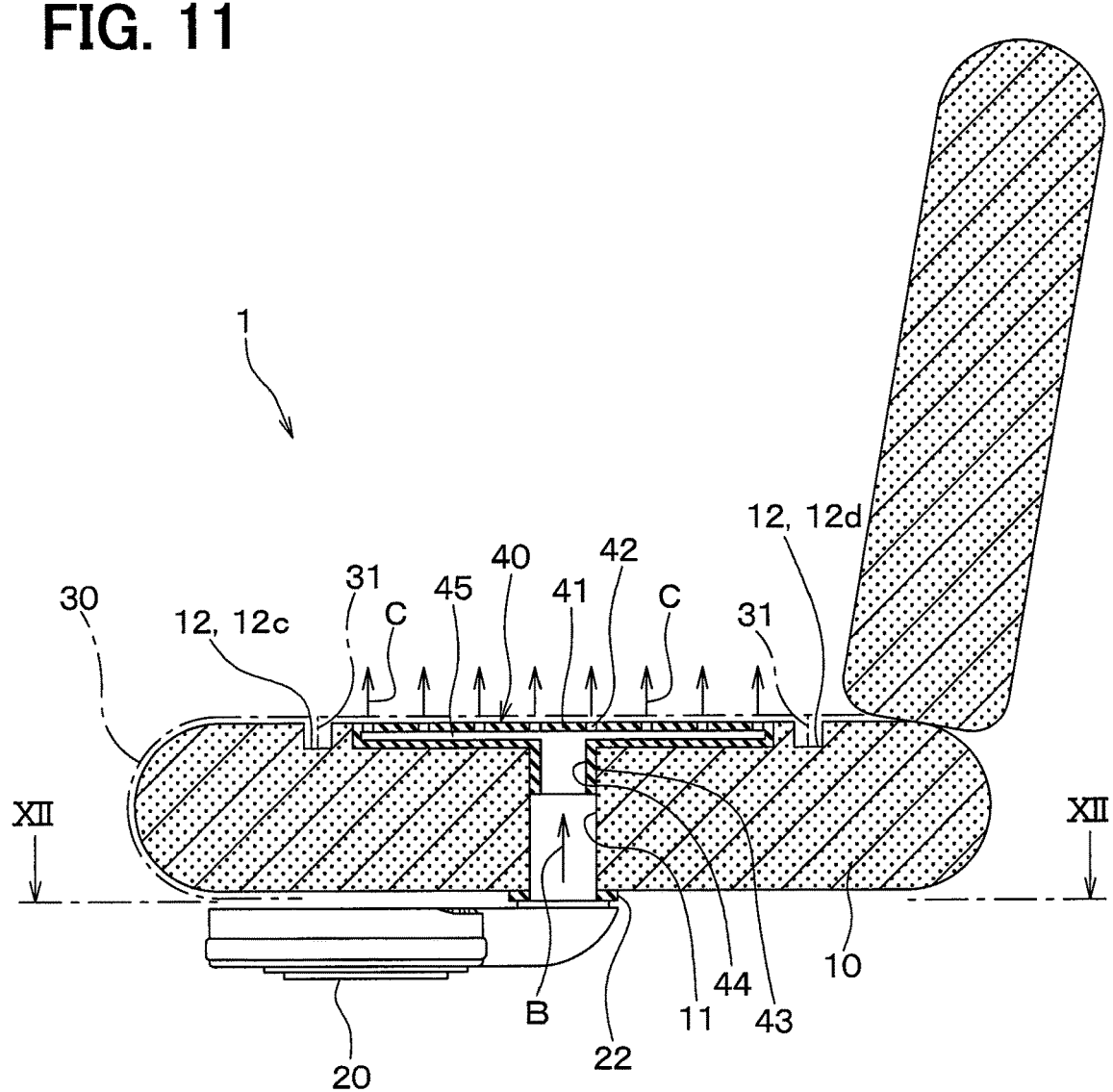
FIG. 11 is a diagram showing a cross-sectional configuration of a seat air conditioner according to a fifth embodiment.
Figure 12:
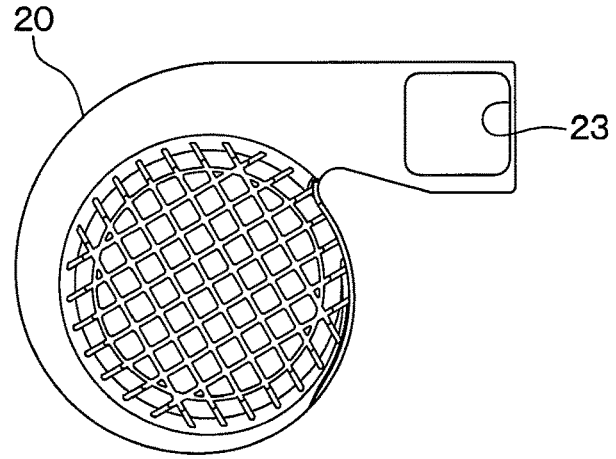
FIG. 12 is a plan view of a blower taken along a line XII-XII of FIG. 11.

As shown in FIGS. 11 and 12, according to the fifth embodiment, in the blower 20, a blowing port or a suction port 23 is connected to a pad hole 11 provided in a seat pad 10. A sealing member 22 may be provided between the blower 20 and the seat pad 10 in order to prevent air flow from leaking from a connection portion.

In the fifth embodiment, the number of components included in the seat air conditioner 1 can be reduced, the configuration can be simplified, and the manufacturing cost can be reduced. The fifth embodiment can also exhibit the same operation and effects as the first to fourth embodiments.

Sixth Embodiment

A sixth embodiment will be described. In a sixth embodiment, in addition to the configuration of the first embodiment, a ventilation sheet 40 is also installed on a backrest, and the other configuration is the same as that of the first embodiment, and therefore, only portions different from those of the first embodiment will be described.

Figure 13:
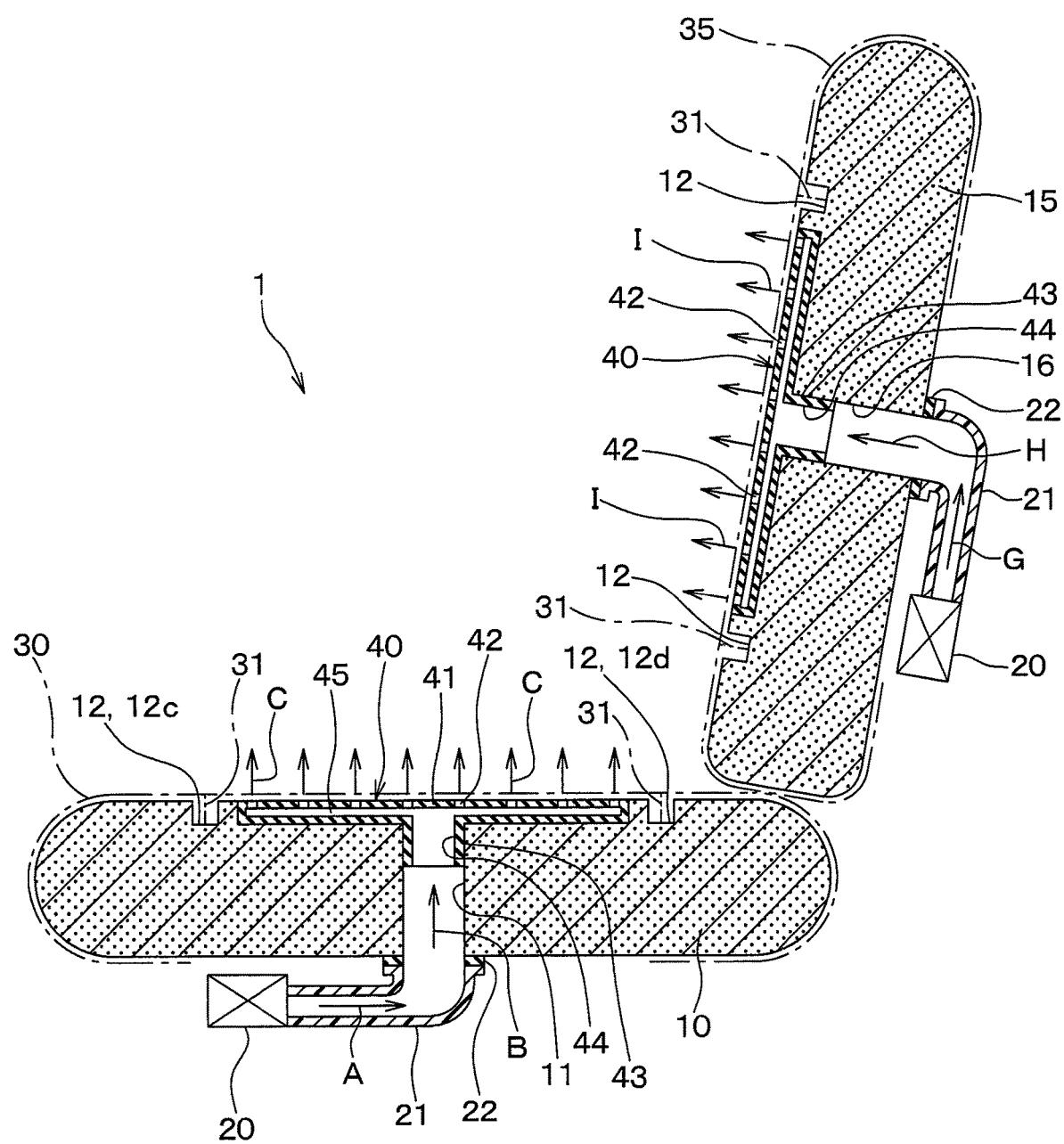
FIG. 13 is a diagram showing a cross-sectional configuration of a seat air conditioner according to a sixth embodiment.

As shown in FIG. 13, in the sixth embodiment, a ventilation sheet 40 is installed on a back seat pad 15 of a backrest supporting a back of an occupant. The ventilation sheet 40 is provided between a back seat pad 15 and a skin 35 covering the back seat pad 15. The ventilation sheet 40 is disposed between multiple hanging grooves 12 provided in the back seat pad 15 and the hanging grooves 12. For that reason, since the hanging grooves 12 are not covered by the ventilation sheet 40, the back seat pad 15 and the skin 35 can be easily fixed to each other.

A cylindrical portion 43 of the ventilation sheet 40 is press-fitted into and fixed to a pad hole 16 provided in the back seat pad 15. As indicated by arrows G and H, an air flow generated by the driving of the blower 20 provided on the back seat pad 15 flows into a connection passage 44 through a duct 21 and a pad hole 16 of the back seat pad 15. After flowing through an air flow passage 45 of a ventilation sheet main body 41, the air flow is blown out from multiple openings 42 through a skin 35 into a vehicle interior as shown by an arrow I. As a result, a hot air between the back of the occupant seated in the seat air conditioner 1 and the skin 35 is discharged, and the comfort of the occupant is improved. The blower 20 may be driven to suction the air from a vehicle interior through the multiple openings 42 of the ventilation sheet main body 41. Also in that case, the hot air between the back of the occupant seated in the seat air conditioner 1 and the skin 35 is suctioned, and the comfort of the occupant is improved. The sixth embodiment can also exhibit the same operation and effects as those of the first to fifth embodiments.

Seventh Embodiment

A seventh embodiment will be described. In the seventh embodiment, since a ventilation sheet 50 is installed across hanging grooves 12 provided in a seat pad 10 in comparison with the first embodiment, and the other configuration is the same as in the first embodiment, only the portions different from the first embodiment will be described.

Figure 14:
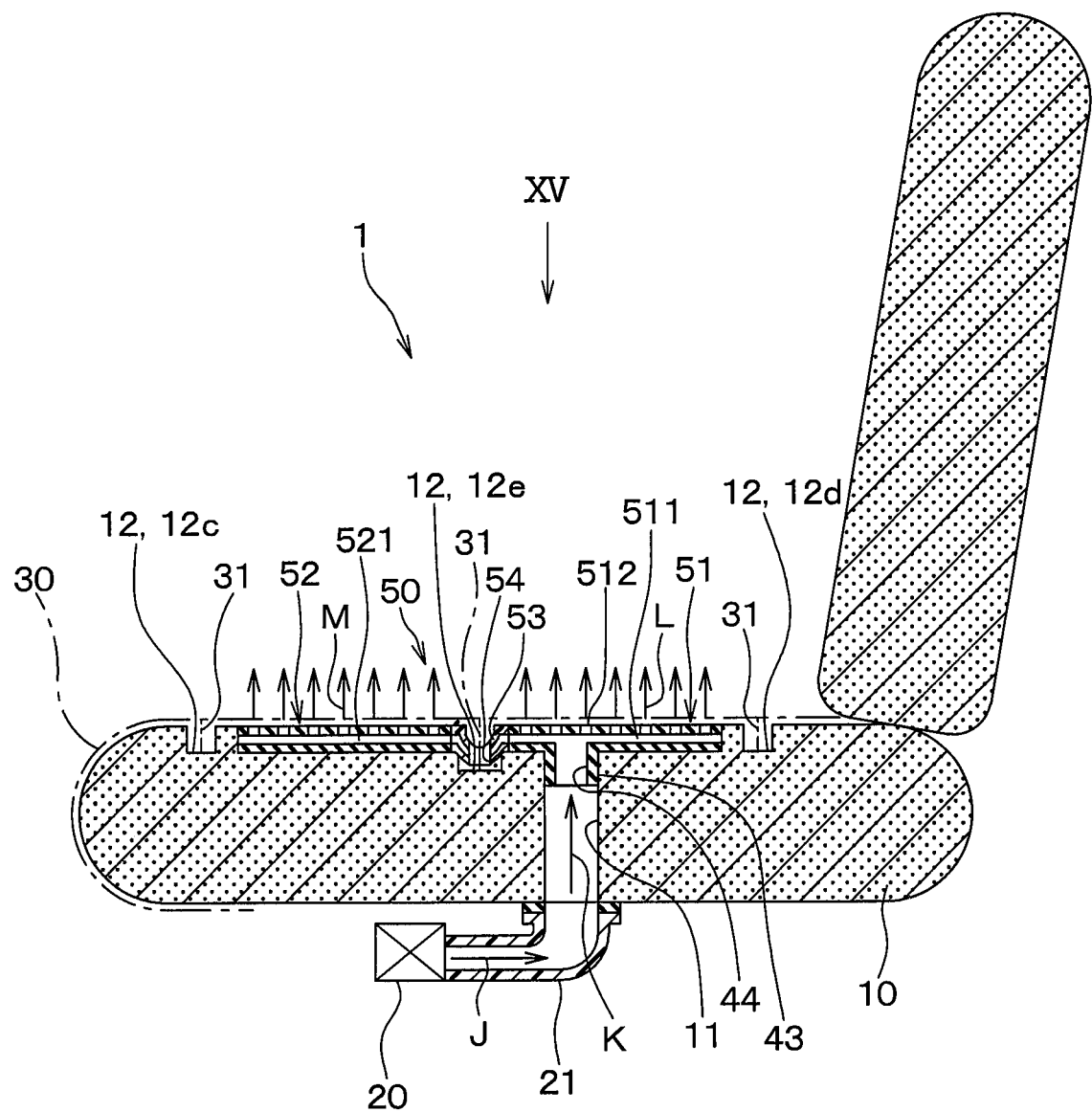
FIG. 14 is a diagram showing a cross-sectional configuration of a seat air conditioner according to the seventh embodiment.
Figure 15:
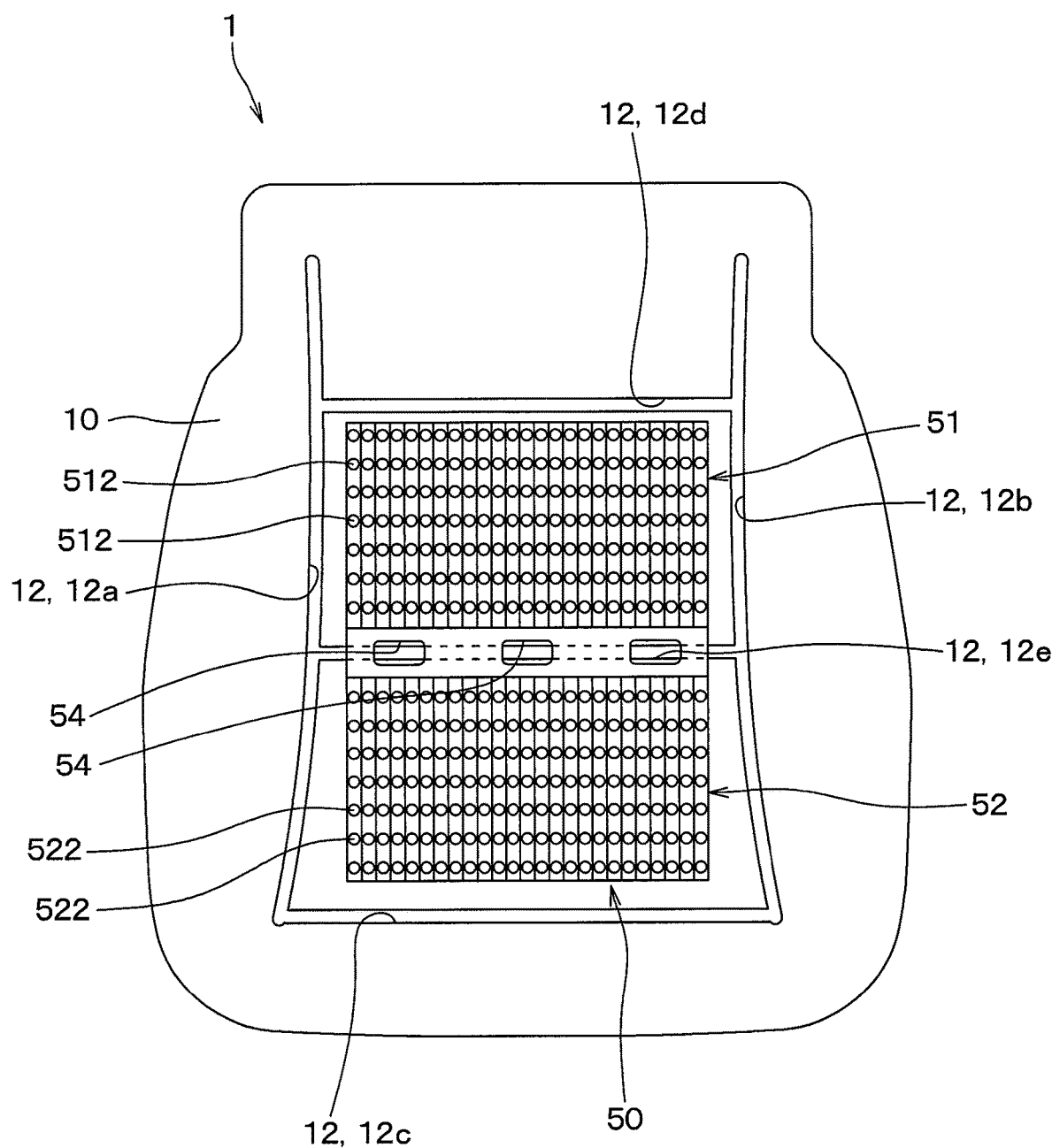
FIG. 15 is a diagram viewed in an XV direction of FIG. 14.

As shown in FIGS. 14 and 15, hanging grooves 12 of the seat pad 10 has two left and right hanging grooves 12a and 12b extending in a front-rear direction, and three hanging grooves 12c, 12d, and 12e extending in a left and right direction so as to connect the left and right hanging grooves 12a and 12b. Three hanging grooves 12c, 12d, and 12e extending in the left-right direction are provided in the front, rear, and intermediate portions of the seat pad 10.

The ventilation sheet 50 is provided between the two left and right hanging grooves 12a and 12b, and is provided between the hanging groove 12c at the front and the hanging groove 12d at the rear of the seat pad 10. For that reason, the ventilation sheet 50 is provided across the hanging groove 12e of an intermediate portion of the seat pad 10.

The ventilation sheet 50 is provided with a coupling member 53 at a position corresponding to the hanging groove 12e of the intermediate portion of the seat pad 10. The coupling member 53 has a groove shape at least partially insertable into the hanging groove 12e of the seat pad 10, and is inserted into the hanging groove 12e. The coupling member 53 has multiple through holes 54 penetrating in the thickness direction. The groove shape of the coupling member 53 is not limited to a cross section substantially U-shaped as shown in the drawing, but can be arbitrarily set, for example, to a cross section V-shaped or U-shaped. As shown in FIG. 3 in the description of the first embodiment, a pad side wire 13 is exposed in the hanging groove 12e at an intermediate portion of the seat pad 10. The through hole 54 of the coupling member 53 is provided at a position corresponding to a position where the pad side wire 13 is exposed in the hanging groove 12e. On the other hand, the skin 30 has a hanging portion 31 and a skin side wire 32 at a position corresponding to the hanging groove 12e. The hanging portion 31 and the skin side wire 32 can be inserted through the through hole 54 of the coupling member 53. For that reason, the skin side wire 32 inserted through the through hole 54 of the coupling member 53 and the pad side wire 13 exposed in the hanging groove 12e of the intermediate portion of the seat pad 10 are caulked and fixed to each other by a C-shaped fixing bracket 33. As a result, the hanging portion 31 provided on the skin 30 is fixed in the hanging groove 12e of the seat pad 10, and the skin 30 is attached in a state of being in close contact with the surface of the seat pad 10.

Figure 18:
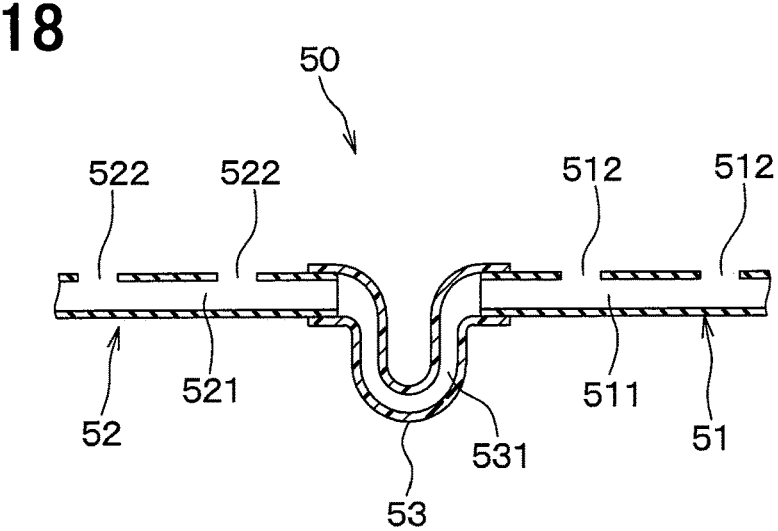
FIG. 18 is a partial cross-sectional view of a line XVIII-XVIII line of FIG. 16.

As shown in FIGS. 16 to 18, the ventilation sheet 50 includes a first ventilation sheet main body 51 provided on one side and a second ventilation sheet main body 52 provided on the other side across the coupling member 53. The first ventilation sheet main body 51 has multiple first air flow passages 511 and multiple first openings 512. The second ventilation sheet main body 52 also has multiple second air flow passages 521 and multiple second openings 522.

The ventilation sheet 50 includes a cylindrical portion 43 on the first ventilation sheet main body 51 side. A connection passage 44 communicating with the first air flow passage 511 is provided in the cylindrical portion 43. The first ventilation sheet main body 51 and the cylindrical portion 43 are made of a rubber or an elastomer and integrally formed. The second ventilation sheet main body 52 is also made of a rubber or an elastomer.

The first ventilation sheet main body 51 of the seventh embodiment has a shape in which multiple tubes having the first air flow passages 511 are integrally formed. For that reason, the first ventilation sheet main body 51 has multiple first air flow passages 511 disposed in parallel. A surface of the first ventilation sheet main body 51 has an uneven shape due to outer walls of the multiple tubes.

Like the first ventilation sheet main body 51, the second ventilation sheet main body 52 has a shape in which multiple tubes having the second air flow passages 521 are integrally formed. For that reason, the second ventilation sheet main body 52 also has multiple second air flow passages 521 arranged in parallel. A surface of the second ventilation sheet main body 52 also has an uneven shape due to the outer walls of the multiple tubes.

On the other hand, the coupling member 53 described above is made of a resin such as polyethylene or polypropylene, for example. A third air flow passage 531 is formed inside the coupling member 53. As shown in FIG. 18, both of an end of the first ventilation sheet main body 51 and an end portion of the second ventilation sheet main body 52 are inserted into the third air flow passage 531 of the coupling member 53. As a result, the first ventilation sheet main body 51, the second ventilation sheet main body 52, and the coupling member 53 are connected to each other, and the first air flow passage 511 included in the first ventilation sheet main body 51, the second air flow passage 521 included in the second ventilation sheet main body 52, and the third air flow passage 531 included in the coupling member 53 communicate with each other.

As shown by arrows J and K in FIG. 14, when the blower 20 is driven, an air flow generated in the blower 20 flows into the connection passage 44 through the duct 21 and the pad hole 11. Part of the air flow flows from the connection passage 44 to the first air flow passage 511 of the first ventilation sheet main body 51, and as indicated by an arrow L, is blown out into the vehicle interior from the multiple first openings 512 of the first ventilation sheet main body 51 through the skin 30. Part of the air flow flowing through the first air flow passage 511 of the first ventilation sheet main body 51 passes through the third air flow passage 531 of the coupling member 53 and flows through the second air flow passage 521 of the second ventilation sheet main body 52. As shown by an arrow M, the air is blown out into the vehicle interior from the multiple second openings 522 of the second ventilation sheet main body 52 through the skin 30. As a result, a hot air between the occupant seated in the seat air conditioner 1 and the skin 30 is discharged, and the comfort of the occupant is improved.

In the seventh embodiment, with the provision of the coupling member 53 in the ventilation sheet 50, even when the hanging grooves 12c, 12d, and 12e are provided in the front, rear, and intermediate portions of the seat pad 10, the ventilation sheet 50 can be provided across the hanging groove 12e in the intermediate portion.

As a result, the ventilation sheet 50 is provided in a substantially flat state on the seating surface side of the seat pad 10 without being curved along the front end surface or the rear end face of the seat pad 10 in the vehicle traveling direction as in the first comparative example. For that reason, the ventilation resistance of the first, second, and third air flow passages 511, 521, and 531 of the ventilation sheet 50 is small. Therefore, the ventilation sheet 50 can increase the volume of air blown into the vehicle interior from the multiple openings 512 and 522, thereby being capable of improving the comfort of the occupant.

In addition, with the use of the ventilation sheet 50 of the seventh embodiment, even when the hanging grooves 12c, 12d, and 12e are provided in the front, intermediate, and rear portions of the seat pad 10, respectively, the seat pad 10 and the skin 30 can be easily fixed to each other by the hanging grooves 12.

Further, in the ventilation sheet 50, the ventilation sheet 50 can be provided across the hanging groove 12e of the intermediate portion without increasing the number of the ventilation sheets 50 in order to avoid the position of the hanging groove 12 provided in the seat pad 10 as in the second comparative example. Therefore, with the use of the ventilation sheet 50, the number of parts can be reduced, the configuration can be simplified, and the manufacturing cost can be reduced.

In the seventh embodiment, the first and second ventilation sheet main bodies 51 and 52 are formed integrally with multiple tubes having first and second air flow passages 511 and 521.

As a result, the first and second ventilation sheet main bodies 51 and 52 have multiple first and second air flow passages 511 and 521 arranged in parallel. The seventh embodiment can also exhibit the same operation and effects as those of the first to sixth embodiments.

Other Embodiments

The present disclosure is not limited to the embodiments described above, and can be modified as appropriate. The above embodiments are not independent of each other, and can be appropriately combined except when the combination is obviously impossible. In each of the above embodiments, it is needless to say that the elements included in the embodiment are not necessarily indispensable except when it is clearly indicated that the elements are particularly indispensable, when the elements are clearly considered to be indispensable in principle, and the like. Further, in each of the above embodiments, when numerical values such as the number, numerical value, quantity, range, and the like of the components of the embodiment are referred to, except in the case where the numerical value is expressly indispensable in particular, the case where the numerical value is obviously limited to a specific number in principle, and the like, the present disclosure is not limited to the specific number. Further, in each of the above-mentioned embodiments, when referring to the shape, positional relationship, and the like of a component and the like, the component is not limited to the shape, positional relationship, and the like, except for the case where the component is specifically specified, the case where the component is fundamentally limited to a specific shape, positional relationship, and the like.

(1) In each of the embodiments described above, the blower 20 is installed at the lower portion or the back surface of the seat pad 10. On the other hand, in another embodiment, the blower 20 may be installed so as to be embedded in the seat pad 10. Alternatively, in other embodiments, the blower 20 may utilize a blower of an air conditioner. In that case, the air flow flows from an air conditioning case to the sheet hole through the duct or the like.

(2) In the sixth embodiment described above, in the seat air conditioner 1, the ventilation sheet 40 is installed in each of the seat pad 10 of the seat on which the occupant is seated and the back seat pad 15 of the backrest. On the other hand, in another embodiment, the seat air conditioner 1 may be configured to install the ventilation sheet 40 only on the back seat pad 15 without installing the ventilation sheet 40 on the seat pad 10 forming the seat on which the occupant is seated.

Conclusion

According to a first aspect shown in part or all of the embodiments described above, the ventilation sheet installed between the seat pad and the skin forming the seat of the vehicle includes the ventilation sheet main body, the multiple openings, and the connection passage. The ventilation sheet main body is formed in a thin plate-shape and has an air flow passage through which an air flow flows. The multiple openings communicate with the air flow passage of the ventilation sheet main body and open to the surface of the ventilation sheet main body on the skin side. The connection passage communicates with the air flow passage of the ventilation sheet main body and communicates with the pad hole provided in the seat pad.

According to a second aspect, the ventilation sheet main body has multiple air flow passages disposed in parallel.

As a result, the rigidity of the ventilation sheet main body is increased by the multiple air flow passages and the walls that separate the air flow passages from each other. For that reason, when the occupant is seated in the seat, the ventilation sheet main body is prevented from collapsing to reduce the cross-sectional area of the air flow passage. Therefore, the ventilation sheet can increase the amount of air blown out into the vehicle interior from the multiple openings or the volume of air suctioned into the multiple openings in the vehicle interior.

According to the third aspect, the ventilation sheet main body is formed by integrally forming the multiple tubes having the air flow passages.

As a result, the ventilation sheet main body has the multiple air flow passages disposed in parallel.

According to a fourth aspect, the seat pad has the multiple hanging grooves for fixing the skin. The ventilation sheet is disposed between the multiple hanging grooves.

As a result, since the ventilation sheet is provided without covering the hanging grooves, the seat pad and the skin can be easily fixed by the hanging grooves.

According to a fifth aspect, the connection passage is provided in the central region of the ventilation sheet main body.

As a result, the distance between the outer periphery of the ventilation sheet main body and the connection passage can be nearly uniformly brought closer to each other as compared with the case where the connection passage is provided at the outer edge of the ventilation sheet main body. For that reason, when the air is supplied from the pad hole, the air can be blown out substantially uniformly from the multiple openings. Further, when the air is suctioned into the pad hole, the air in the vehicle interior can be substantially uniformly suctioned from the multiple openings.

According to a sixth aspect, the ventilation sheet has the cylindrical portion extending in a cylindrical shape from the ventilation sheet main body and has the connection passage.

This makes it possible to easily assemble the ventilation sheet to the seat pad by fitting the cylindrical portion into the pad hole of the seat pad.

According to a seventh aspect, the ventilation sheet main body and the cylindrical portion are formed to include a rubber or an elastomer.

As a result, the ventilation sheet can improve the seating comfort of the occupant.

According to an eighth aspect, the cross-section of the inner wall of the air flow passage of the ventilation sheet main body is round or polygonal.

This increases the rigidity of the ventilation sheet main body. For that reason, when the occupant is seated in the seat, the ventilation sheet main body is prevented from collapsing to reduce the cross-sectional area of the air flow passage.

According to a ninth aspect, the ventilation sheet main body mainly includes the first ventilation sheet main body and the second ventilation sheet main body. The ventilation sheet further includes the coupling member that connects the first ventilation sheet main body and the second ventilation sheet main body, and includes the third air flow passage communicating the first air flow passage of the first ventilation sheet main body and the second air flow passage of the second ventilation sheet main body.

According to the above configuration, even when a hanging groove is present in the intermediate portion of the seat pad, the coupling member is inserted into the hanging groove, thereby making it possible to install the ventilation sheet on the seating surface side of the seat pad in a substantially flat state.

According to a tenth aspect, the coupling member has the groove shape at least partially insertable into the hanging groove of the seat pad, and has the through hole penetrating in the thickness direction.

According to the above configuration, the hanging portion provided on the skin and the hanging groove of the seat pad can be fixed to each other through the through hole.

According to an eleventh aspect, the seat air conditioner installed in the vehicle interior of the vehicle includes the blower that generates the air flow, the seat pad having the pad hole through which the air flow generated by the blower flows, the skin covering the surface of the seat pad, and the ventilation sheet installed between the seat pad and the skin. The ventilation sheet has been described in the first aspect.

As a result, the seat air conditioner can exhibit the same operation and effects as those of the ventilation sheet of the first aspect described above.

According to a twelfth aspect, the seat pad has multiple hanging grooves for fixing the skin. The skin has the hanging portion fixed in the hanging groove at the position corresponding to the hanging grooves provided in the seat pad. The ventilation sheet is disposed between the multiple hanging grooves.

As a result, since the ventilation sheet is provided without covering the hanging grooves, the seat pad and the skin can be easily fixed by the hanging grooves.

The invention claimed is:

1. A ventilation sheet installed between a seat pad and a skin that form a seat of a vehicle, the ventilation sheet comprising:
   a ventilation sheet main body formed in a plate-shape, the ventilation sheet main body including
      an elongate trunk air flow passage that extends to a center portion of the ventilation sheet main body, and
      a plurality of elongate branch air flow passages, including first branch air flow passages on a first side of the trunk air flow passage and second branch air flow passages on a second side of the trunk air flow passage opposite the first side in fluid communication with the trunk air flow passage, the plurality of branch air flow passages extending in parallel with each other, wherein the ventilation sheet main body is a one-piece single layer that comprises an upper portion and a lower portion encapsulating the trunk air flow passage and the plurality of branch air flow passages,
   a plurality of openings in fluid communication with the branch air flow passages of the ventilation sheet main body, the plurality of openings formed to open at a surface of the ventilation sheet main body facing the skin; and
   a connection passage in fluid communication with the trunk air flow passage of the ventilation sheet main body and in fluid communication with a pad hole provided in the seat pad, wherein
   each of the trunk air flow passage and the plurality of branch air flow passages are arranged to extend lengthwise in a common plane parallel to an upper surface of the seat pad, and the surface of the ventilation sheet main body and the upper surface of the seat pad are coplanar.

2. The ventilation sheet according to claim 1, wherein the ventilation sheet main body includes the plurality of branch air flow passages disposed in parallel lines.

3. The ventilation sheet according to claim 1, wherein the ventilation sheet main body is formed integrally from a plurality of tubes.

4. The ventilation sheet according to claim 1, wherein
   the seat pad includes a plurality of hanging grooves for fixing the skin, and
   the ventilation sheet main body is disposed between the plurality of hanging grooves.

5. The ventilation sheet according to claim 1, wherein the connection passage is provided in a central region of the ventilation sheet main body.

6. The ventilating sheet according to claim 1, further comprising a cylindrical portion that extends from the ventilation sheet main body in a cylindrical shape to provide the connection passage.

7. The ventilation sheet according to claim 6, wherein the ventilation sheet main body and the cylindrical portion are formed to include rubber or elastomer.

8. The ventilation sheet according to claim 1, wherein a cross section of an inner wall of the ventilation sheet main body has a round shape.

9. A seat air conditioner installed in a vehicle interior of a vehicle, comprising:

a blower that generates an air flow;
a seat pad that has a pad hole through which the air flow generated by the blower flows;
a skin that covers a surface of the seat pad; and
a ventilation sheet that is installed between the seat pad and the skin, the ventilation sheet including:
  a ventilation sheet main body formed in a plate-shape, the ventilation sheet main body including
    an elongate trunk air flow passage that extends to a center portion of the ventilation sheet main body, and
    a plurality of elongate branch air flow passages including first branch air flow passages on a first side of the trunk air flow passage and second branch air flow passages on a second side of the trunk air flow passage opposite the first side in fluid communication with the trunk air flow passage, the plurality of branch air flow passages extending in parallel with each other, wherein the ventilation sheet main body is a one-piece single layer that comprises an upper portion and a lower portion encapsulating the trunk air flow passage and the plurality of branch air flow passages,
  a plurality of openings in fluid communication with the branch air flow passages of the ventilation sheet main body, the plurality of openings formed to open at a surface of the ventilation sheet main body facing the skin; and
  a connection passage in fluid communication with the trunk air flow passage of the ventilation sheet main body and in fluid communication with the pad hole provided in the seat pad, wherein
  each of the trunk air flow passage and the plurality of branch air flow passages are arranged to extend lengthwise in a common plane parallel to an upper surface of the seat pad, and the surface of the ventilation sheet main body and the upper surface of the seat pad are coplanar.

10. The seat air conditioner according to claim 9, wherein
the seat pad has a plurality of hanging grooves for fixing the skin,
the skin has a plurality of hanging portions fixed within respective ones of the plurality of hanging grooves provided in the seat pad, and
the ventilation sheet is disposed between the plurality of hanging grooves.

* * * * *